(12) United States Patent
Mak

(10) Patent No.: US 9,114,351 B2
(45) Date of Patent: Aug. 25, 2015

(54) CONFIGURATIONS AND METHODS FOR HIGH PRESSURE ACID GAS REMOVAL

(75) Inventor: John Mak, Santa Ana, CA (US)

(73) Assignee: FLUOR TECHNOLOGIES CORPORATION, Aliso Viejo, CA (US)

( * ) Notice: Subject to any disclaimer, the term of this patent is extended or adjusted under 35 U.S.C. 154(b) by 748 days.

(21) Appl. No.: 13/257,885

(22) PCT Filed: Mar. 24, 2010

(86) PCT No.: PCT/US2010/028419
§ 371 (c)(1),
(2), (4) Date: Dec. 7, 2011

(87) PCT Pub. No.: WO2010/111337
PCT Pub. Date: Sep. 30, 2010

(65) Prior Publication Data
US 2012/0073441 A1    Mar. 29, 2012

Related U.S. Application Data

(60) Provisional application No. 61/210,987, filed on Mar. 25, 2009.

(51) Int. Cl.
B01D 53/14   (2006.01)
B01D 53/62   (2006.01)
B01D 53/78   (2006.01)
C10L 3/10    (2006.01)

(52) U.S. Cl.
CPC ........ B01D 53/1462 (2013.01); B01D 53/1425 (2013.01); B01D 53/62 (2013.01); B01D 53/78 (2013.01); C10L 3/102 (2013.01); B01D 2256/24 (2013.01); B01D 2257/504 (2013.01); Y02C 10/04 (2013.01)

(58) Field of Classification Search
None
See application file for complete search history.

(56) References Cited

U.S. PATENT DOCUMENTS

| 3,664,091 | A | * | 5/1972 | Hegwer | 95/161 |
|---|---|---|---|---|---|
| 4,235,613 | A | | 11/1980 | Castoe et al. | |
| 4,417,449 | A | | 11/1983 | Hegarty et al. | |
| 6,139,605 | A | | 10/2000 | Carnell | |
| 7,192,468 | B2 | | 3/2007 | Mak et al. | |
| 2003/0106334 | A1 | * | 6/2003 | Gaskin | 62/632 |
| 2005/0000360 | A1 | * | 1/2005 | Mak et al. | 95/236 |
| 2005/0172807 | A1 | * | 8/2005 | Mak | 95/235 |
| 2006/0150812 | A1 | | 7/2006 | Mak et al. | |
| 2006/0266214 | A1 | * | 11/2006 | Won | 95/234 |
| 2007/0006731 | A1 | | 1/2007 | Menzel | |
| 2007/0006732 | A1 | | 1/2007 | Mitariten | |
| 2008/0167511 | A1 | | 7/2008 | Prim | |

(Continued)

FOREIGN PATENT DOCUMENTS

| EP | 0036733 | 7/1984 |
|---|---|---|
| GB | 2142041 | 10/1987 |

(Continued)

Primary Examiner — Duane Smith
Assistant Examiner — Adam W Bergfelder
(74) Attorney, Agent, or Firm — Fish & Tsang, LLP

(57) ABSTRACT

Physical solvent is regenerated using flashing and stripping processes to produce an ultra-lean solvent. In especially preferred aspects, flashed C1-C3 hydrocarbons are recycled to the absorber, while C4+ hydrocarbons are recovered from the CO2 that is removed from the solvent. It is further preferred that depressurization of the rich solvent provides most of the refrigeration duty.

9 Claims, 2 Drawing Sheets

(56) References Cited

U.S. PATENT DOCUMENTS

2008/0256977 A1* 10/2008 Mowrey et al. ............... 62/620
2010/0126433 A1    5/2010 Kozaki

FOREIGN PATENT DOCUMENTS

| WO | 2010/039785 | 4/2010 |
|----|-------------|--------|
| WO | 2011/102830 | 8/2011 |

* cited by examiner

CONFIGURATIONS AND METHODS FOR HIGH PRESSURE ACID GAS REMOVAL

This application claims priority to U.S. provisional application with the Ser. No. 61/210,987, which was filed Mar. 25, 2009, and which is incorporated by reference herein.

FIELD OF THE INVENTION

The field of the invention is removal of acid gas from a feed gas, and particularly acid gas from high pressure gases with high CO2 and H2S content at concurrent production of a pipeline gas and a concentrated CO2 stream for EOR (Enhanced Oil Recovery).

BACKGROUND OF THE INVENTION

As current low sulfur content natural gas fields are being depleted, sour gas fields are increasingly developed to meet production demands. Acid gas removal from these fields (and especially removal of highly sour gas fields) requires significant capital investment as well as operating costs. Compounding such disadvantages, sour gas field production plants must also comply with gas pipeline specifications, energy efficiency and emissions requirements that have become increasingly stringent. Moreover, the acid gas content of at least some of these gas fields will increase over time and so places additional burdens on operating conditions and costs.

While numerous acid gas removal methods are known in the art, most of them have at least some drawbacks. For example, where a conventional amine absorption process is used, the circulation rate for the amine solvent (or other chemical solvent) is generally proportional to the acid gas content. Also, where the acid gas concentration is relatively high or increases over time, the steam demand for solvent regeneration is relatively high or increases, and with that imposes undesirably high greenhouse gas emissions. Still further, chemical solvents also exhibit saturation with respect to acid gas loading (i.e., mole of acid gas per mole of amine), which is especially disadvantageous at high or increasing acid gas concentrations.

On the other hand, where physical solvents are used, acid gas loading of the solvent actually increases with the acid gas concentration/partial pressure. Thus, at least in theory, physical solvents appear to be a desirable choice for acid gas fields with relatively high sour gas content. Furthermore, physical solvent regeneration can be accomplished to at least some extent by flash regeneration. Unfortunately, without external heating physical solvents can only be partially regenerated. Consequently, unless an external heat source (e.g., steam) is used for regeneration, physical solvents are currently deemed not suitable for deep treatment of sour gases, and particularly H2S, to meet pipeline gas quality (e.g., 2 to 4 ppmv H2S). Alternatively, heat recovered from the feed gas and/or a compressor discharge can be used to improve solvent regeneration as described in PCT/US09/58955. Such configurations and methods advantageously reduce energy and equipment requirements; however, they fail to produce a CO2 product with purity suitable for EOR and/or a sales gas product meeting pipeline specifications.

Additionally, due to the high solubility of hydrocarbons in physical solvents, the CO2 stream often contains more than 5 mol % of hydrocarbons, which fails to meet the CO2 purity required for enhanced oil recovery. For example, CO2 can be removed from a feed gas at supercritical pressure as described in U.S. Pat. No. 7,192,468. While such removal is relatively efficient, hydrocarbon losses are often undesirably high. Moreover, to some extent, recovery of hydrocarbons can be achieved by recycling of the low pressure flash gases; however, it is impractical due to the extremely high re-compression. Similarly, as described in PCT/US10/24382, acid gas is removed from a feed gas at pressures at or below those of the above '468 patent. However, the recovered CO2 stream still contains a relatively high amount of hydrocarbons, reducing product revenue and potentially rendering the CO2 unfit for EOR. Therefore, while physical solvent processes can be used for treatment of feed gases having significant amount of hydrocarbons, such processes often fail to recover hydrocarbon content in the CO2 stream as well as the treated gas stream, resulting in losses in product revenues and production of non-compliant products.

Thus, although various configurations and methods are known to remove acid gases from a feed gas, all or almost all of them suffer from one or more disadvantages. Among other things, physical solvent processes typically fails to produce a treated gas that meets below 4 ppmv gas pipeline specifications, and/or hydrocarbon concentrations are undesirably high in the removed CO2. Therefore, there is still a need to provide improved methods and configurations for acid gas removal.

SUMMARY OF THE INVENTION

The present invention is directed to configurations and methods of acid gas removal from a high pressure feed gas while reducing hydrocarbon losses. In especially preferred aspects, C1-C3 hydrocarbons are recycled to the absorber while CO2 and C4+ hydrocarbons are flashed at elevated temperature from the solvent. Further stripping of the flashed solvent with treated feed gas provides a second hydrocarbon recycling stream that is fed back to the absorber. Most preferably, the CO2 is separated from the C4+ hydrocarbons to produce CO2 suitable for enhanced oil recovery and a C4+ hydrocarbon product.

In one aspect of the inventive subject matter, a method of acid gas removal from a feed gas includes a step of contacting the feed gas in an absorber with an ultra-lean physical solvent to form a rich solvent and a treated feed gas. In a further step, the rich solvent is sequentially depressurized to remove C1-C3 hydrocarbons to so form a depressurized solvent, and the C1-C3 hydrocarbons that were released during depressurization are recycled to the absorber. In yet another step, the depressurized solvent is flashed and stripped to produce an ultra-lean solvent and a flashed gas that predominantly comprises H2S, CO2 and C4+ components, wherein stripping is performed with a portion of the treated feed gas to form stripped vapors that are also recycled to the absorber. The flashed gas is then separated in a separator to produce a CO2 stream having less than 5% C4+ components and a C4+ product.

While not limiting to the inventive subject matter, it is preferred that the refrigeration content of the depressurized solvent is employed for cooling of the ultra-lean solvent and/or the feed gas, and that the depressurized solvent is heated to a temperature of at least 50° F. using the heat content of the feed gas. It is also generally preferred that the portion of the treated feed gas is heated and expanded to stripper pressure in a turbo expander to generate power. Sequential depressurization of the rich solvent is typically performed using one or more hydraulic turbines, and flashing is typically done in a first flashing step to about atmospheric pressure and a second step to below atmospheric pressure.

Most typically, the feed gas entering the absorber has a pressure of at least 1000 psia, comprises at least 10 mol % $CO_2$, and is cooled prior to entering the absorber to a temperature that is effective to condense heavy hydrocarbons (e.g., C5+). In further contemplated embodiments, the flashed gas is dehydrated in a dehydration unit prior to the step of separating the flashed gas in the separator, and/or the $CO_2$ stream from the separator is partially condensed to produce a reflux stream and a $CO_2$ vapor.

In another aspect of the inventive subject matter, a method of regenerating a physical solvent will therefore include a step of providing a rich physical solvent at a pressure of at least 1000 psig, wherein the rich solvent comprises C1-C3 hydrocarbons, C4+ components, and $CO_2$. The rich solvent is then sequentially depressurized to a pressure effective to the remove C1-C3 hydrocarbons from the rich solvent while maintaining substantially all of the $CO_2$ to thereby form a depressurized solvent, and the C1-C3 hydrocarbons are recycled to an absorber. In yet another step, the depressurized solvent is flashed to a pressure sufficient to release substantially all of the $CO_2$ and C4+ components to thereby form a flashed solvent, and the C4+ components are separated from the $CO_2$ to thereby produce a $CO_2$ stream having less than 5% C4+ components and a C4+ product. The so flashed solvent is then stripped with a portion of treated feed gas to so form an ultra-lean solvent and stripped vapors, and the stripped vapors are recycled to the absorber.

As before, it is generally preferred that sequential depressurization is performed using a hydraulic turbine, that the depressurized rich solvent is used to cool the feed gas and/or the ultra-lean solvent, and/or that the depressurized solvent is heated to a temperature of at least 50° F. using heat content of a feed gas to an absorber. It is also typically preferred that flashing is performed in two steps (first flashing step to about atmospheric pressure, and second step to below atmospheric pressure), and that the flashed solvent is stripped with treated feed gas as stripping gas. While not limiting to the inventive subject matter, it is generally preferred to heat the stripping gas prior to stripping and to expand the heated stripping gas in a turbo expander to thereby generate power. Most typically, the flashed gas is dehydrated in a dehydration unit prior to the step of separating the C4+ components from the $CO_2$.

Consequently, and viewed from a different perspective, a gas treatment plant is contemplated that includes an absorber configured to absorb C1-C3 hydrocarbons, C4+ components, and $CO_2$ from a feed gas using an ultra-lean solvent at a pressure of at least 1000 psig to thereby allow formation of a treated feed gas and a rich solvent. A plurality of flash vessels is then configured to receive and sequentially flash the rich solvent to produce a depressurized solvent and C1-C3 hydrocarbons, and a low-pressure flash stage is fluidly coupled to the flash vessels to flash the depressurized solvent and to produce a flashed gas comprising $CO_2$ and C4+ components and a flashed solvent. Most typically, a stripping column is fluidly coupled to the low-pressure flash stage to strip the flashed solvent with a portion of the treated feed gas to so produce the ultra-lean solvent and stripped vapors, and a fractionator is fluidly coupled to the low-pressure flash stage to separate C4+ components from the $CO_2$ to thereby produce a $CO_2$ stream having less than 5% C4+ components and a C4+ product. Contemplated plants will further include a first recycle conduit that is fluidly coupled to the plurality of flash vessels and the absorber for recycling the C1-C3 hydrocarbons to the absorber, and a second recycle conduit that is fluidly coupled to the stripping column and the absorber for recycling the stripped vapors to the absorber.

Most preferably, contemplated plants will further include a heat exchanger to heat the depressurized solvent using heat from the feed gas, and/or a separator to separate condensed heavy hydrocarbons from the feed gas. It is still further preferred that the low-pressure flash stage is configured to allow flashing of the depressurized solvent to sub-atmospheric pressure.

Various objects, features, aspects and advantages of the present invention will become more apparent from the following detailed description of preferred embodiments of the invention.

DETAILED DESCRIPTION

Figure 1:
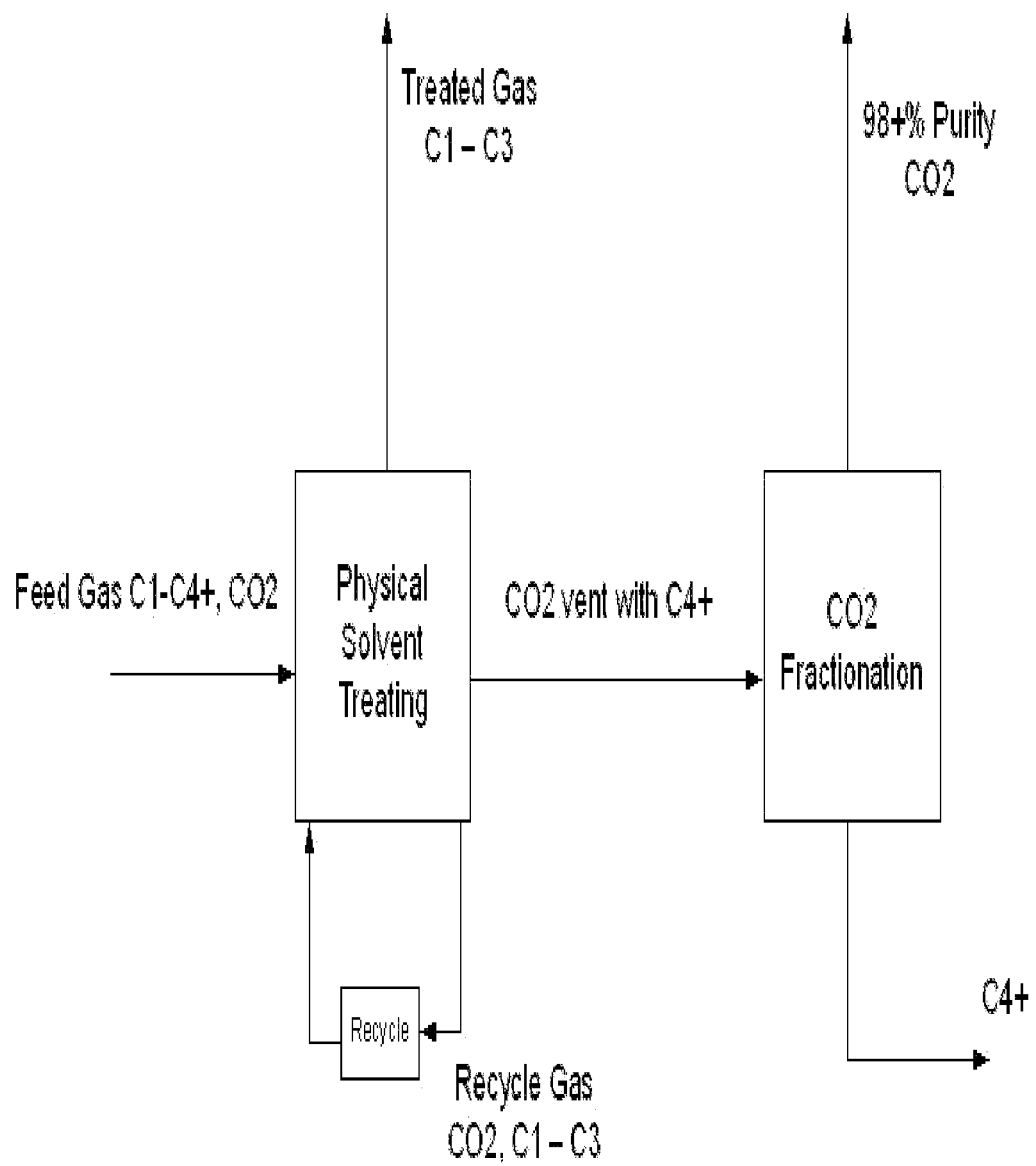
FIG. 1 is an exemplary block schematic for acid gas removal using a physical solvent according to the inventive subject matter.

The inventor has discovered highly efficient configurations and methods of acid gas removal from various feed gases using an ultra-lean physical solvent, in which the solvent is regenerated in a flashing and stripping process that allows recycling of C1-C3 components to the absorber and that allows separation of C4 and heavier components from the flashed $CO_2$. The feed gas typically comprises between about 10-30 mole % $CO_2$, and between about 1000 ppmv and 1 mole % $H_2S$. Most preferably, the feed gas is chilled, and the rich solvent is regenerated to an ultra-lean state using waste heat and stripping (e.g., with a portion of treated gas), while hydrocarbons are recovered by recycling the flash gases in multi-stage separators. Hydrocarbons in the $CO_2$ stream are separated from the $CO_2$ in a fractionator, which reduces the hydrocarbon loss to less than 5%, more typically less than 4%, and most typically less than 2%.

In still further preferred configurations and methods, the feed gas and the solvent are cooled by external refrigeration and internal refrigeration generated from flashing of the rich solvent. Most typically, contemplated plants will also include a feed gas chiller that removes the bulk of heavier hydrocarbons (C5+).

In one particularly preferred aspect of the inventive subject matter, contemplated plants and methods include several multi-stage flash vessels to produce hydrocarbon rich flash gases for recycling to the absorber to minimize hydrocarbons losses, and to further produce an acid gas enriched flashed solvent that is subsequently letdown in pressure to at least one separator for the production of acid gases. Pressure let-down is most preferably performed using one or more hydraulic turbines to so allow for cooling of the solvent as well as for generation of energy (most typically electric energy) that may then be used to drive one or more compressors and/or pumps in the plant. As the pressure let-down is performed over several stages, C1-C3 hydrocarbons can be effectively recovered and after recompression be recycled to the absorber.

In a subsequent low-pressure flash stage, the solvent is then further let down in pressure to near atmospheric pressure (e.g., equal or less than 100 psig, more typically equal or less than 50 psig) and most preferably sub-atmospheric pressure (e.g., equal or less than 10 psia, more typically equal or less than 5 psia) for release of $CO_2$, which is particularly advantageous where the depressurized solvent from the upstream flash vessels has been heated. In particularly preferred aspects, heating of the depressurized solvent is performed using waste heat, and especially uses heat content from a compressor discharge, a steam condenser, and/or even ambient heat where available. Additionally, it is generally preferred that a stripper receives and strips the flashed solvent from the last stage separator (which is most typically the sub-atmospheric pressure flash vessel), preferably using a portion of the treated gas or other sulfur depleted gas to produce an ultra-lean solvent with less than 100 ppmv, more preferably less than 50 ppmv, even more preferably less than 10 ppmv, and most preferably less than 4 ppmv $H_2S$.

Therefore, it should be appreciated that contemplated configurations and methods allow for efficient removal of $CO_2$ and $H_2S$ while reducing hydrocarbon losses. Most preferably, lighter hydrocarbons are recovered in a flashing step prior to $CO_2$ removal while heavier hydrocarbons (e.g., C4+ hydrocarbons) are removed from the flashed $CO_2$. Light hydrocarbons used for stripping are also recovered via recycling to the absorber. A block diagram of one exemplary plant configuration according to the inventive subject matter is depicted in FIG. 1 where the feed gas that includes C1-C4+ components and $CO_2$ is fed to the physical solvent treatment unit. Hydrocarbon recycle gas from the flashing stages is fed back to the front end of the plant while the treated gas (predominantly containing C1-C3) is fed to the pipeline, terminal, or other destination. The flashed $CO_2$ stream that now includes the C4+ components is then fed to a fractionator where purified $CO_2$ and a C4+ hydrocarbon stream are produced. Thus, it should be appreciated that the advantages of a physical solvent process can be implemented in an acid gas treatment plant without loss of hydrocarbon product and/or reduction in $CO_2$ quality while at the same time allowing for production of a valuable C4+ product.

Therefore, it should be appreciated that contemplated methods of regenerating a rich solvent include those in which the rich solvent is depressurized over multiple stages for recovery of methane and ethane (typically at least 95%, and most typically at least 99%) and in which the so treated solvent is further heated and depressurized to atmospheric and/or sub-atmospheric pressure, wherein heating is preferably accomplished using waste heat from the compressor discharge to at least partially regenerate the solvent. Viewed from a different perspective, methods and plants for removal of $CO_2$ and $H_2S$ from a sour feed gas are contemplated in which a physical solvent is used in an absorber to produce a treated gas that is depleted in acid gases and to produce a rich physical solvent that is flashed over multiple depressurizing steps to produce flashed hydrocarbon vapors that are recycled to the feed system.

Typically, contemplated systems and methods will allow for heating of the flashed solvent in one or more heat exchangers, most preferably using low-grade heat from the feed compressor, feed gas, or other source to drive off $CO_2$ in a subsequent flashing to lower (typically sub-atmospheric) pressure. A solvent stripper can then be used to produce an ultra-lean solvent, preferably using treated feed gas or other sulfur depleted gas as a stripping gas. The stripper overhead vapors are then compressed and recycled to the feed gas system for further hydrocarbon recovery. In most typical examples, contemplated plants and methods reduce the hydrocarbon content in the $CO_2$ stream to below 5 mol % for EOR operation while producing hydrocarbon products (C4+) for sales.

Figure 2:
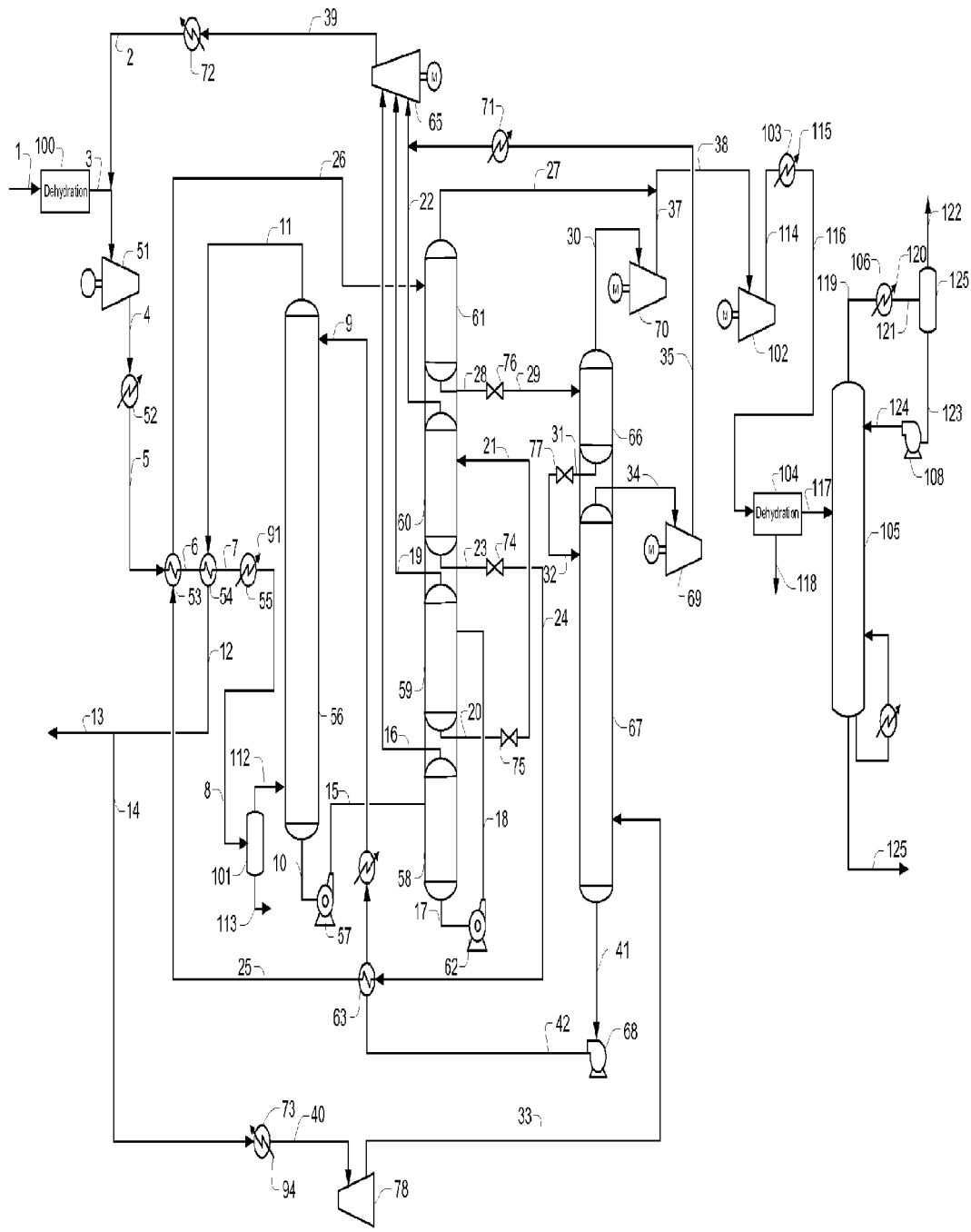
FIG. 2 is an exemplary schematic for an acid gas removal plant with physical solvent according to the inventive subject matter.

FIG. 2 depicts a more detailed schematic of the block diagram of FIG. 1. Here, feed gas stream 1, typically at 12 mol % $CO_2$ and 1 mol % $H_2S$, at 100° F. and about 650 psig is dried with a dehydration unit 100, producing a dry gas stream 3. The term "about" where used herein in conjunction with a numeral refers to a +/−10% range of that numeral. The drying step is in most cases necessary to avoid hydrate formation in the solvent treating unit. The dried gas is then mixed with the recycle gas stream 2 and compressed by compressor 51 forming stream 4, at about 1200 psig and 170° F. The compressor discharge is cooled by ambient cooler 52 forming stream 5, at about 120° F. The extent of cooling in exchanger 52 can be adjusted as necessary to provide the heating requirement for solvent regeneration. Stream 5 is further cooled in exchanger 53 by the rich solvent stream 25 to about 10° F. (stream 6), and in exchanger 54 by the treated gas stream 11 to about 0° F., forming stream 7, which is finally cooled in exchanger 55 using refrigeration 91 to about −20° F. The chilled stream 8 is further processed in separator 101, producing a hydrocarbon liquid stream 113 which can be further processed (not shown) for sales, and a vapor stream 112 as feed to absorber 56. The key process streams are shown in the heat and material balance Table 1 below.

TABLE 1

| Mol Frac | Stream | | | | | | | | | |
|---|---|---|---|---|---|---|---|---|---|---|
| | 1 | 2 | 16 | 19 | 22 | 27 | 30 | 13 | 14 | 34 |
| CO2 | 0.1201 | 0.2322 | 0.1303 | 0.2691 | 0.6106 | 0.8615 | 0.8500 | 0.0130 | 0.0130 | 0.1271 |
| H2S | 0.0100 | 0.0360 | 0.0051 | 0.0095 | 0.0224 | 0.0757 | 0.1121 | 0.0000 | 0.0000 | 0.0524 |
| N2 | 0.0059 | 0.0039 | 0.0041 | 0.0012 | 0.0001 | 0.0000 | 0.0000 | 0.0068 | 0.0068 | 0.0057 |
| CH4 | 0.7877 | 0.6464 | 0.7959 | 0.6307 | 0.2374 | 0.0079 | 0.0007 | 0.9006 | 0.9006 | 0.7470 |
| C2H6 | 0.0545 | 0.0593 | 0.0499 | 0.0700 | 0.0927 | 0.0212 | 0.0075 | 0.0594 | 0.0594 | 0.0480 |
| C3H8 | 0.0186 | 0.0182 | 0.0130 | 0.0177 | 0.0331 | 0.0252 | 0.0192 | 0.0178 | 0.0178 | 0.0148 |
| IC4 | 0.0016 | 0.0014 | 0.0009 | 0.0010 | 0.0020 | 0.0038 | 0.0040 | 0.0013 | 0.0013 | 0.0015 |
| NC4 | 0.0011 | 0.0011 | 0.0006 | 0.0007 | 0.0013 | 0.0027 | 0.0033 | 0.0008 | 0.0008 | 0.0012 |
| C5+ | 0.0003 | 0.0008 | 0.0001 | 0.0001 | 0.0002 | 0.0013 | 0.0020 | 0.0002 | 0.0002 | 0.0012 |
| psia | 665 | 670 | 750 | 260 | 90 | 30 | 15 | 1,190 | 1,190 | 16 |
| MMscfd | 1,710 | 264 | 23 | 44 | 44 | 196 | 20 | 1,495 | 128 | 153 |

The chilled feed gas stream 112 is counter-currently scrubbed by ultra-lean solvent stream 9 at about −20° F. producing a treated gas stream 11 at about −12° F. and a rich solvent stream 10 at about −10° F. Most typically, the absorber contains contacting devices, including packings or trays, or other suitable media for acid gas absorption. The rich solvent stream is letdown in pressure via the first hydraulic turbine 57 to about 750 psig, forming stream 15, at −8° F. The letdown stream is separated in separator 58, producing a flashed vapor stream 16 and a flashed liquid stream 17. The flashed liquid is further letdown in pressure via the second hydraulic turbine 62 to about 250 psig, forming stream 18. The letdown stream is separated in separator 59, producing a flashed vapor stream 19 and a flashed liquid stream 20.

The flashed solvent stream 20 is letdown in pressure in JT valve 75 to about 90 psig forming stream 21 at about −11° F. The letdown stream is separated in separator 60, producing a flashed vapor stream 22 and a flashed liquid stream 23. The flashed liquid is further letdown in pressure via JT valve 74 to about 60 psig, forming stream 24 at about −14° F. The refrigeration content in the flashed solvent is recovered in exchanger 63 in chilling the lean solvent stream 42 from 48° F. to about 0° F. In this exchanger, the flashed solvent is heated to about 0° F. forming stream 25, which is further heated by the feed gas stream in exchanger 53 to about 55° F. to so form stream 26, which is separated in separator 61 operating at about 30 psig, producing a flashed vapor stream 27 and a flashed liquid stream 28 at about 50° F. The flashed solvent stream 28 is letdown in pressure in JT valve 76 to about 2 psig forming stream 29. The letdown stream is separated in separator 66, producing a flashed vapor stream 30 (that is compressed by compressor 70) and a flashed liquid stream 31.

The separator 66 which is typically (but not necessarily) located above the stripper 67 allows the flashed solvent stream 31 to gravity flow to the lower stripper section via valve 77 forming stream 32. For effective stripping, about 5% of the warmed high pressure treated gas (stream 12) is used as stripping gas while the remainder leaves the plant as commodity stream 13. To improve the energy efficiency of the stripping process, the high pressure stripping gas stream 14 is heated by steam 94 in heater 73 to about 300° F. forming stream 40 which is then let down in pressure in a turboexpander 78. About 5 MW or even higher power output can be generated by the turboexpander which can be used for operate a power generator or driving the solvent pumps. The low pressure stream 33 can be fed to the stripper. For optimum operation, the stripping gas to solvent flow should be maintained at a volumetric ratio of 10 to 30, in order to ensure effective stripping. Typically, the stripping operate can produce an ultra-lean solvent with less than 10 ppmv H2S content that can be used for treating the feed gas to meet pipeline specification. Thus, it should be recognized that the CO2 content in the treated feed gas can be reduced to equal or less than 0.2 mol %, more typically equal or less than 0.15 mol %, and most typically equal or less than 0.1 mol %. Most typically, the stripper contains contacting devices, including packings or trays, or other suitable media for acid gas stripping.

The stripper 67 produces an acid gas rich overhead vapor 34 and an ultra-lean solvent 41 that is pumped by pump 68, ultimately entering the absorber 56 as stream 9. The overhead vapor is compressed by compressor 69 to about 90 psig, forming stream 35 which is cooled in exchanger 71 prior to mixing with stream 22 and fed to the low stage of compressor 65. Compressor 65 further compresses flashed vapor streams 19 and 16, forming stream 39 at about 650 psig, which is cooled in exchanger 72, prior to recycling to the absorber. The CO2 streams 37 and 27 are combined forming stream 38 that can be used for EOR. It should be noted that in most cases the hydrocarbon content in stream 38 is between 5-10 mol %, which is generally not acceptable for use in EOR. To remove the C4+ hydrocarbons, stream 38 is compressed by compressor 102 to about 250 psig forming stream 114, which is cooled by cooling water stream 115 in exchanger 103, forming stream 116 at about 90° F. and 240 psig. This stream is then dried in a dehydration unit 104 to produce a CO2 stream with a dew point temperature of −40° F., which is required to meet the CO2 specification for EOR and avoid hydrate formation the downstream fractionator. Water is removed as stream 118 from the dehydration unit and a dried CO2 stream 117 is produced, which is routed to fractionator 105 for removal of over 95% of the C4+ component as a liquid product stream 125. Overhead condenser 106 (preferably using propane refrigeration 120 for cooling the overhead stream 119) is used to provide reflux to the fractionator. Chilled overhead stream 121 is processed in separator 125 producing liquid stream 123 and vapor stream 122. The liquid stream 123 is then pumped by pump 108 forming stream 124 that is returned to the fractionator as reflux. Thus, it should be appreciated that stream 122 contains less than 5 mol % hydrocarbons and is now suitable for the EOR.

With respect to suitable feed gases it should be appreciated that the pressure of such gases may vary considerably, and that the nature of the gas will at least in part determine the pressure. It is particularly preferred that the feed gas has a pressure of at least 400 psig, more typically at least 1000 psig, even more typically at least 1200 psig. Thus, it should be noted that the feed gas may be compressed (or let down in pressure) prior to entry into the absorber. It is also noted that the feed gas can be combined with the C1-C3 hydrocarbon recycle stream at any point upstream of the absorber, or in the absorber. Most preferably, while the absorber will operate at a pressure of at least 700 psig, more preferably at least 1000 psig, and most preferably at least 1500 psig, suitable absorber pressures are typically less than 3000 psig, and more typically less than 2500 psig.

Similarly, it should be noted that the nature of the solvent may vary considerably, and all physical solvents and mixtures thereof are deemed appropriate for use herein. There are numerous physical solvents known in the art, and exemplary preferred physical solvents include FLUOR SOLVENT™ (propylene carbonate), NMP (normal-methylpyrolidone), SELEXOL™ (dimethyl ether of polyethylene glycol), and TBP (tributyl phosphate), and/or various polyethylene glycol dialkyl ethers. Alternatively, other solvents including enhanced tertiary amine (e.g., piperazine) or other solvent or a mixture of solvents may be employed having similar behavior as physical solvent.

It should be further noted that flashing of the rich solvent may be performed using numerous devices, and it is generally contemplated that all pressure reduction devices are suitable for use herein. However, it is especially preferred that at least one of the pressure reduction devices is a hydraulic turbine as such device generates refrigeration cooling by expansion and flashing of the acid gas content while providing shaft work (e.g., drive the solvent circulation pump or generate electric power), which can be advantageously employed to provide recompression energy. With respect to the amount of pressure reduction it is typically preferred that the rich solvent (after providing work and/or cooling) is let down in pressure to a pressure sufficient to release flashed vapors with methane content of about 20 to 70%. These vapors are recycled to the absorber minimizing methane losses to less than 5%, more preferably less than 3%, and most preferably less than 1%. Thus, typical pressure reductions will be from absorber pressure (e.g., between 1500 and 1000 psig) to equal or less than 100 psig, more typically equal or less than 80 psig, and most typically equal or less than 60 psig.

The so produced depressurized solvent is then flashed in a low-pressure flash stage to so release CO2. Most typically, the depressurized stream is first heated using various heat sources, and it is especially preferred that the heat sources provide low-grade heat or waste heat to the depressurized solvent. Among other heat sources, especially preferred heat sources include compressor discharge streams, the feed gas (as delivered or after compression), waste heat from boilers, ambient heat, etc. In especially preferred aspects, the low-pressure flash stage allows flashing of the heated depressurized solvent to atmospheric, and even more preferably, subatmospheric pressure to release CO2 and C4+ components.

The so produced C4+ hydrocarbon containing CO2 stream is preferably separated in a conventional separator as schematically illustrated in FIG. 2. However, various alternative separation methods and devices are also deemed suitable. For example, where compression is available, CO2 may be separated from the C4+ components using membrane separation or an autorefrigeration process. Regardless of the separation process, it is generally preferred that the CO2 after separation will contain C4+ hydrocarbons at a concentration of equal or less than 5 mol %, and more typically of equal or less than 2.5 mol %, which is suitable for EOR. Remaining H2S and hydrocarbons can be removed from the solvent in the downstream stripping column.

With respect to the stripping column it is noted that the stripping column is preferably operated using a los-Hh2S stripping gas to so form an ultra-lean solvent that is capable of producing a treated feed gas with an H2S concentration of equal or less than 10 ppmv, more preferably equal or less than 5 ppmv, and most preferably equal or less than 3 ppmv. Thus, suitable stripping gases include inert gases, and especially a portion of the treated feed gas, which is advantageously recycled back to the absorber.

Consequently, it should be recognized that configurations according to the inventive subject matter will significantly reduce overall energy consumption and capital cost for high acid gas removal as compared to conventional acid gas removal processes including amine or other physical solvents or membranes. Moreover, contemplated configurations and processes will typically not require an external heat source, and heat sources if required will be supplied by the feed gas or heat of compression either from refrigeration and/or feed gas compression system, thus further reducing energy consumption and impact on the environment. Still further, enhanced oil recovery projects will frequently encounter an increase in acid gas concentration in the feed gas, typically from 10% up to as high as 60%. Contemplated configurations and processes can accommodate these changes with essentially the same solvent circulation. Thus, among other benefits of contemplated configurations and methods, reduction in both external refrigeration and cooling water consumption (by using the flashed rich solvent in cooling the lean solvent to the absorber, and then in cooling the feed gas compressor discharge to reduce cooling water consumption) are particularly desirable. Additionally, the absorber overhead gas may be used in chilling the feed gas to the absorber to further minimize the feed gas chiller refrigeration requirement.

It should also be recognized that contemplated methods and configurations allow for substantial simplification of plant design as significantly less supporting offsite and/or utility systems (e.g., steam boilers or fuel gas heaters) are needed. For example, waste refrigeration from flashing of the physical solvent is used for process cooling, thus minimizing the cooling water consumption. Thus, in most instances, the only utility requirement is electric power. Additional cooling (where needed) can be achieved with ambient air or cooling water, which greatly reduces environmental impact. Further aspects and advantages are disclosed in our co-pending U.S. patent application published as US 2005/0172807 and our U.S. Pat. No. 7,192,468, both of which are incorporated by reference herein.

Thus, specific embodiments for configurations and methods for improved acid gas removal have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of acid gas removal from a feed gas, comprising:
   contacting the feed gas in an absorber with an ultra-lean physical solvent to form a rich solvent and a treated feed gas;
   sequentially depressurizing the rich solvent to remove C1-C3 hydrocarbons from the rich solvent to form a depressurized solvent, and recycling the C1-C3 hydrocarbons to the absorber;
   flashing and stripping the depressurized solvent to produce an ultra-lean solvent and a flashed gas that predominantly comprises CO2 and C4+ components;
   wherein the step of stripping is performed with a portion of the treated feed gas to form stripped vapors, and wherein the stripped vapors are recycled to the absorber to thereby recover C1-C3 hydrocarbons from the portion of the treated feed gas; and
   separating the flashed gas in a separator to produce a CO2 stream having less than 5% C4+ components and a C4+ product.

2. The method of claim 1 wherein refrigeration content of the depressurized solvent is employed for cooling of at least one of the ultra-lean solvent and the feed gas.

3. The method of claim 1 wherein the depressurized solvent is heated to a temperature of at least 50° F. using heat content of the feed gas.

4. The method of claim 1 wherein the portion of the treated feed gas is heated and then expanded to stripper pressure in a turbo expander to thereby generate power.

5. The method of claim 1 wherein the feed gas entering the absorber has a pressure of at least 1000 psia, comprises at least 10 mol % CO2, and is cooled prior to entering the absorber to a temperature that is effective to condense heavy hydrocarbons.

6. The method of claim 1 wherein the step of sequentially depressurizing the rich solvent comprises depressurization using a hydraulic turbine.

7. The method of claim 1 wherein the step of flashing is performed using a first flashing step to about atmospheric pressure and a second step to below atmospheric pressure.

8. The method of claim 1 wherein the flashed gas is dehydrated in a dehydration unit prior to the step of separating the flashed gas in the separator.

9. The method of claim 1 wherein the CO2 stream from the separator is partially condensed to produce a reflux stream and a CO2 vapor.

* * * * *